United States Patent

[11] 3,588,804

[72] Inventor Jacob Robert Fort
 El Paso, Tex.
[21] Appl. No. 833,580
[22] Filed June 16, 1969
[45] Patented June 28, 1971
[73] Assignee Globe Universal Sciences, Inc.
 Midland, Tex.

[54] TELEMETERING SYSTEM FOR USE IN BOREHOLES
10 Claims, 7 Drawing Figs.

[52] U.S. Cl. .................................................... 340/18
[51] Int. Cl. .................................................... G01v 1/40
[50] Field of Search ........................................... 340/18, 18
 (NC), 18 (LD); 181/0.5 (J)

[56] References Cited
UNITED STATES PATENTS
2,957,159 10/1960 Fitchette ...................... 340/18
3,252,225 5/1966 Hixson ......................... 340/18X Primary Examiner—Malcolm F. Hubler
Attorneys—Arnold Roylance, Kruger and Durkee, Tom Arnold, Donald C. Roylance, Walter Kruger, Bill Durkee, Frank S. Vaden, III and Darryl M. Springs ABSTRACT: A telemetering system for transmitting information from the bottom of a borehole to the surface using the drill pipe as a transmission link wherein the information is transmitted on a carrier consisting of ultrasonic shear waves induced in a drill pipe. The shear waves may be in the form of a pulsed ultrasonic frequency or a continuous ultrasonic frequency or a combination of the two. The shear waves are detected at the surface and the information recovered from the detected signal.

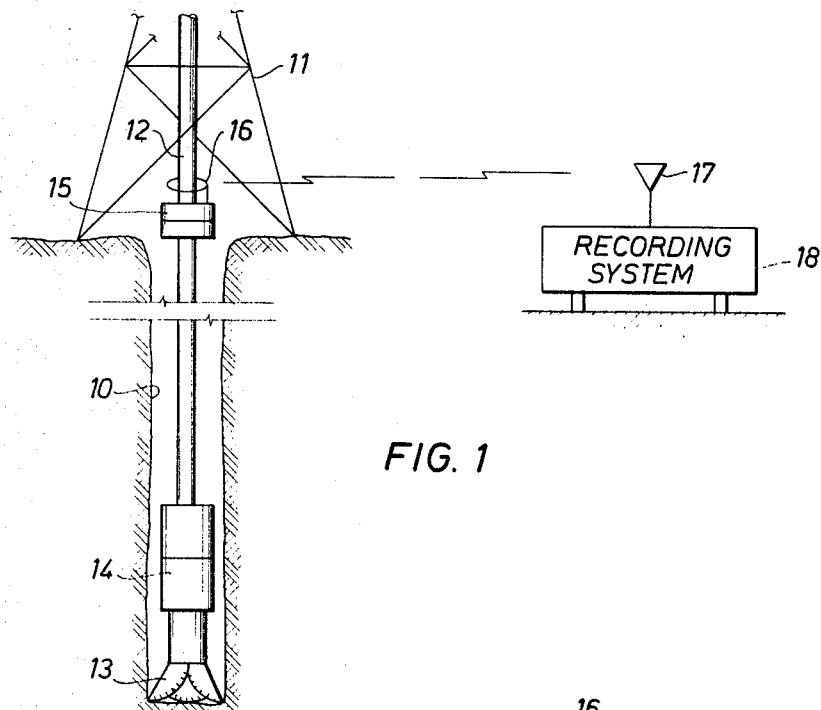
FIG. 1
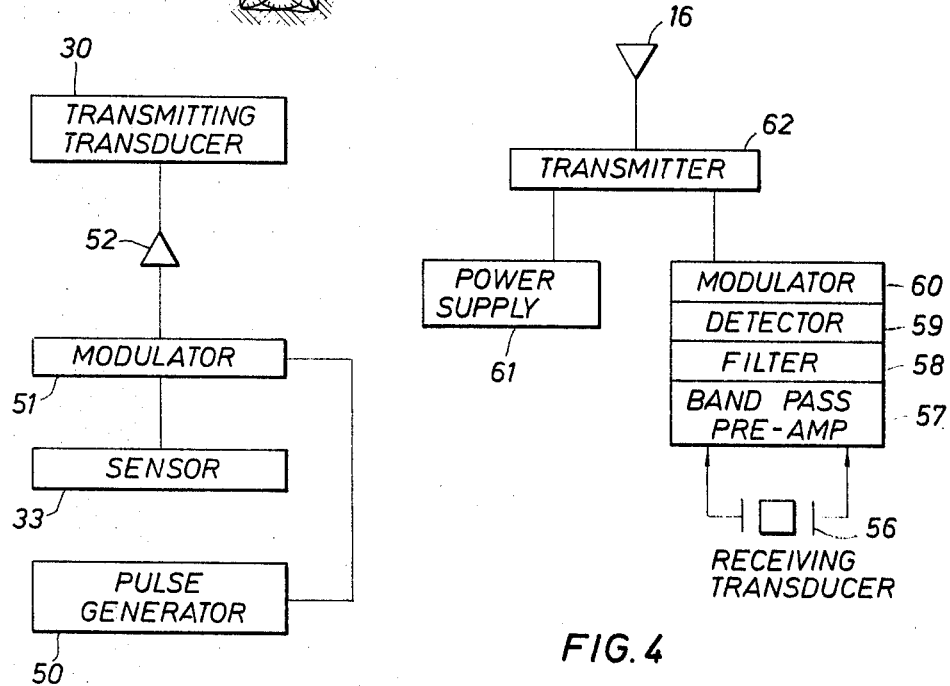
FIG. 3
FIG. 4
Jacob R. Fort
INVENTOR
BY Arnold, Roylance,
Kruger & Durkee
ATTORNEYS Patented June 28, 1971

Jacob R. Fort
INVENTOR

BY Arnold, Roylance,
Kruger & Durkee
ATTORNEYS

TELEMETERING SYSTEM FOR USE IN BOREHOLES

BACKGROUND OF THE INVENTION

The present invention relates to the drilling of boreholes and more particularly to a method for telemetering information from the bottom of a borehole to the surface during the actual drilling operation. In the past, many systems have been developed for telemetering information from the bottom of a borehole to the surface during the actual drilling operation. MOst of these systems fall in the following categories of systems using electrical transmission circuits wherein a conductor is placed in or adjacent the drill string to form the transmission circuit and systems using various types of acoustic compressional waves to transmit information over the drill string. Both the electrical and the acoustical systems could be provided with repeaters for insuring the transmission of the signal to the surface with sufficient amplitude to permit its detection. Also, it has been suggested that the drill string could be used as a waveguide to transmit ultrahigh frequency electromagnetic energy as a means for telemetering information.

In addition to the above system, there has been developed a system that creates pressure pulses in the mud stream to transmit information. More particularly, the flow of the mud stream is interrupted to create pressure pulses which are coded to transmit the desired information.

All of the above systems while theoretically possible, have never been placed in widespread use, since they contain serious practical drawbacks. For example, electrical circuits require that the drilling crew assemble the various circuit components each time the drill pipe is removed from the borehole and in addition insure that the electrical contact is made between the various segments of the conductors. In addition, most electrical circuits are subject to damage due to the rough handling of the drill string as it is removed or inserted into the borehole. Thus, electrical circuits tend to fail after a very short time. In the case of systems depending upon the transmission of compressional waves over the drill string, the waves are damped as they travel up the drill string, since they tend to cause the drill string to move vertically in the borehole. This vertical movement of the drill string in the area of the pipe joints between the individual sections requires considerable energy, since the joints must be moved against the drilling mud and the resultant loss of energy seriously damps the longitudinal compressional waves. Thus, the waves are rapidly damped and are of too low an amplitude to the detected. In an attempt to overcome this difficulty it has been suggested that repeaters could be placed along the drill string to receive the longitudinal or compressional waves and retransmit them at an amplified level. While this is a possible solution, it seriously complicates the system, since each repeater requires a power supply and in addition requires that a special section be inserted in the drill pipe. This again requires additional time on the part of the operating personnel which renders the system unsatisfactory for general use.

SUMMARY OF THE INVENTION

The present invention solves the above problems by providing a system using ultrasonic shear waves to provide a carrier for transmitting information over the drill pipe to the surface. The frequency of the ultrasonic shear waves is selected so that they are confined within the wall thickness of the drill pipe and propagated along the drill pipe in much the same way as radar waves are propagated down a waveguide.

The ultrasonic shear waves may be transmitted either in a pulse form or a continuous wave, but preferably a combination is used wherein a short pulse of ultrahigh frequency shear waves is transmitted through the drill string. The exact frequency of the shear waves depends upon various parameters, including the length of the individual sections of drill pipe, as well as the diameter and wall thickness thereof. The frequency of the shear waves can be selected so that they fall within a pass band which can be readily transmitted over the drill pipe. The information may be transmitted by modulating the shear waves by using various techniques, such as amplitude modulation or conventional frequency modulation or the pulse length may be varied. Also, it is possible to use a digital format to transmit the information wherein the pulses of shear waves are the digital coded signal.

The invention preferably uses an instrument package which is disposed at the bottom of the drill pipe and contains the power supply for the various circuits as well as the sensors for sensing the desired downhole information. The signals from the sensors are used to modulate the signal that powers the transducers. The transducers in turn are disposed on the drill pipe to induce shear waves within the drill pipe. The shear waves travel to the surface where they can be detected by a suitable receiving transducer. The receiving transducer reconverts the shear waves to an electrical signal which can be transmitted to a recording system either by means of sliprings and a direct wire or by means of a radio signal.

DESCRIPTION OF THE DRAWINGS

This invention will be more easily understood from the following detailed description when taken in conjunction with the attached drawings in which:

FIG. 1 is a schematic drawing of a drill rig with the present invention installed thereon;

FIG. 3 is a block diagram of the downhole electronics used in the instrument package;

FIG. 4 is a view of the uphole electronics;

DESCRIPTION OF THE PREFERRED EMBODIMENT

Figure 2:
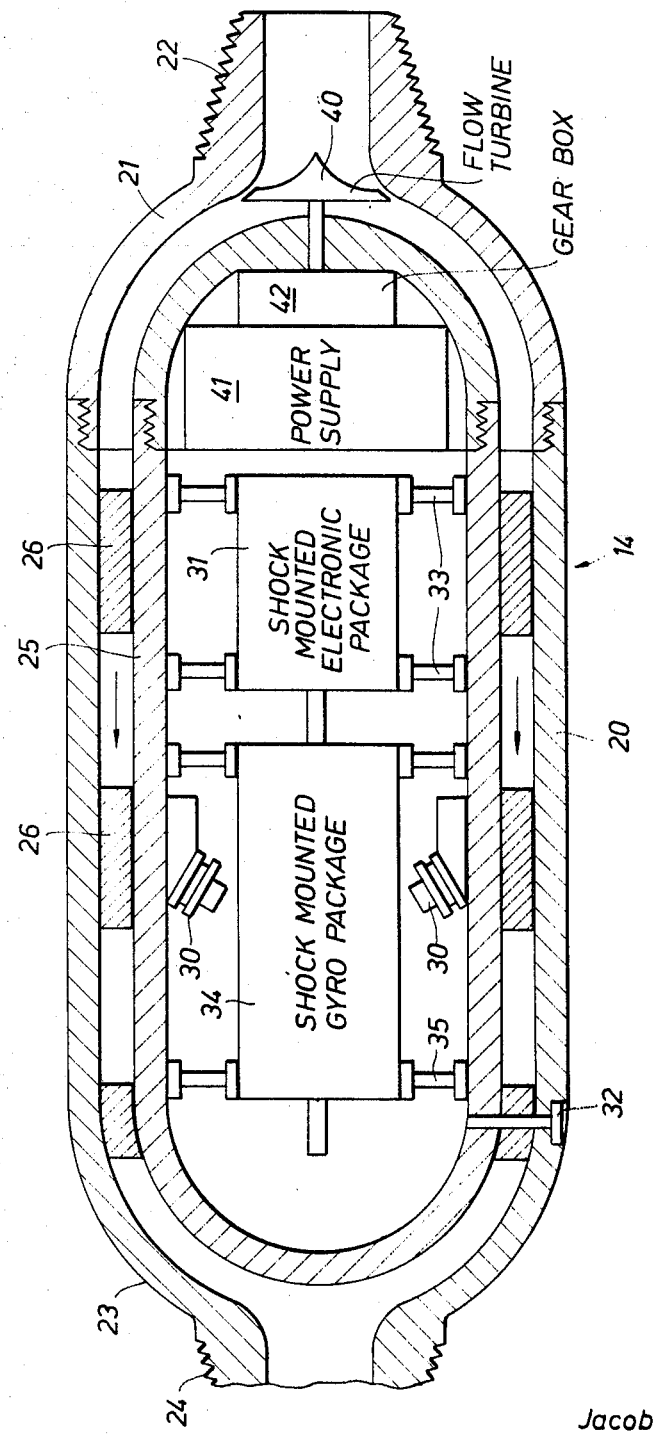
FIG. 2 is an elevation view of the downhole instrument package.

The present invention can be more easily understood by first considering the character of ultrasonic shear waves and how they are transmitted. Ultrasonic shear waves have very short wavelengths and thus can easily be confined within the wall thickness of the drill pipe and propagated along the pipe in much the same manner as electromagnetic waves are propagated along a waveguide. Since the shear waves are confined within the pipe wall thickness, the thickness in turn dictates the lower limit of the frequency of the waves.

The shear waves induce a torsional or twisting motion to the pipe. Thus, the only friction or energy loss in the system is the friction between the outer surface of the pipe and the fluid or drilling mud that fills the borehole. Since this friction is normally very low, losses in using shear waves are correspondingly low. This is in direct contrast to prior art systems which attempted to use longitudinal or compressional waves to transmit signals over the drill pipe. In the case of longitudinal compression waves, the drill pipe is moved in longitudinal direction. The resulting movement between the drill pipe and the drilling fluid damps the movement of the drill pipe, particularly at the thickened portions of the drill pipe and in the vicinity of the joints between the individual sections.

While the use of shear waves has several advantages, several factors are critical to the successful performance of the system. First, the efficiency of the signal injection into the drill pipe and the effect of the propagation of the signals on the data being transmitted must be considered in designing the system. As described below, the present invention uses a transducer design which is directed to the maximum efficiency in the injection of the signal into the drill pipe and to recovery of the signal therefrom.

Referring now to FIG. 1, there is shown a schematic diagram of a drilling rig 11 positioned over a borehole 10. The drilling rig is a conventional rotary drilling rig and utilizes a drill pipe 12 having a drill bit 13 at its lower end for drilling the borehole. In addition, of course, the rig has a rotary table, not shown, and a Kelly section for coupling the rotary cable to the drill pipe. An instrument package 14 is mounted at the bottom of the drill pipe adjacent the drill bit 13 and contains the necessary sensors for sensing the various parameters of the borehole, as well as the transducers for transmitting the sense information over the drill string in the form of shear waves. At the surface of the shear waves are received by the receiving package 15 which is preferably mounted on the Kelly unit of the drill rig. Mounting the receiving package on the Kelly eliminates the need to remove the receiving package each time the drill string is pulled and reinserted into the borehole. The receiving package is provided with an antenna 16 in order that the sensed information may be transmitted by radio link to an antenna 17 located on a recording truck 18. While a radio link is shown for coupling the receiving instrument package to the recording truck 18, obviously the information could also be removed through sliprings and transmitted by direct cable link to the recording van, The use of the radio link for transmitting the information eliminates the maintenance and other problems that arise when sliprings are used.

Referring now to FIG. 2, there is shown an elevation view of the downhole instrument package. The downhole instrument package utilizes an outer housing 20 which is provided with end pieces 21 and 22 at opposite ends. The end pieces terminate in male threads 22 and 24 in order that the instrument package may be coupled between two sections of the drill pipe using conventional coupling elements. Positioned within the outer housing is a second housing 25 which is completely enclosed. Housing 25 is spaced from the outer housing by means of spacing members 26 which have passageways formed therein (not shown). The annular space between the two housings forms a passageway for the drilling fluid or mud in order that it may be circulated past the instrument package to the drill bit and returned to the surface.

The transmitting transducers 30 are mounted on the inner wall of the sealed inner housing 25. The transmitting transducers are mounted at an angle to the inner wall and disposed in a particular geometrical configuration more fully described and explained below.

The transducers are coupled to an electronic package 31 which contains the necessary circuits for receiving the signals from the various sensing units 32 and converting it to a suitable signal for energizing the transmitting transducers. The sensing units 32 are located on the instrument package and disposed so that they can detect the various parameters that it is desired to measure. Fore example, the sensing units can be disposed so that they measure the borehole temperature and pressure, the resistivity, the spontaneous potential and other borehole information that is commonly obtained through the use of various logging techniques. The information obtained by the sensor should be converted to an electrical signal which can be accepted by the electronic package and used to modulated or otherwise vary the high frequency pulse used to energize the transmitting transducer. The instrument package is preferably shock-mounted by means of a plurality of shock mounts 33 that may be conventional resilient mounts fastened to the inner surface of the inner housing and the outer surface of the electronic package. Also positioned within the borehole is a gyropackage 34, which incudes means for forming a stable gyroplatform in order that the azimuth and orientation of the instrument package may be measured. The gyropackage is preferably shock-mounted by means of shock mounts 35, similar to mounts 33 previously discussed. In addition, the gyropackage can be designed to measure the inclination of the borehole to provide a record of the deviation of the borehole from the vertical. Disposed at the top of the downhole instrument package is a mud turbine 40 which is positioned so that it can be driven by the flow of the mud stream. The mud turbine is coupled to a gearbox 42, which in turn is coupled to a generator disposed in a power supply package 41. The power supply package, in addition of the generator, should contain the circuits required for energizing the various electronic gear as well as the sensing units. In place of the mud turbine 40, gearbox 42 and the generator of power supply 41, conventional battery power supplies or other types of power supplies such as fuel cells can be used.

Referring now to FIG. 3, there is shown a simplified block diagram of an electronic system capable of energizing the transmitting transducers 30. More particularly the sensor 33 is coupled to a modulator 51 which is also supplied with a high frequency pulse from a pulse generator 50. As explained above, it is preferable to use a combination of high frequency pulses and a continuous high frequency signal for energizing the transmitter 30. More particularly, the length of the pulse should be sufficient to permit the shear waves to travel up a section of the drill pipe and be reflected from the coupling back to the opposite end. In this way, the shear waves will form a standing wave and completely fill the drill pipe and thus increase the overall efficiency of the transmission. Thus, the absolute length of the pulse will depend upon the length of each section of the drill pipe and the frequency used for energizing the transmitting transducer. For example, normal drill pipe is provided in 30-foot sections and assuming a 100 kHz. pulse, the pulse length would be approximately 200 microseconds. The modulator 51 may be a conventional AM type of modulating circuit or may take other forms such as varying the frequency of the pulse or its amplitude in a particular pattern. Likewise, the modulating circuit may be replaced with a digital type of circuit in which the sensor signal is converted to a particular digital code, which is then used to modulate the pulse in a particular manner to transmit the digital code. The amplifier 52 is a power amplifier which is used to amplify the modulating signal before it is used to drive the transmitting transducer 30. As explained above, the exact construction and disposition of the transmitting transducer is more fully explained below in relation to FIG. 6.

Referring to FIG. 4, there is shown a block diagram in simplified form of the receiving electronics which are disposed preferably on the Kelly unit of the drill rig. MOre particularly, there is shown a receiving transducer 56 which is coupled to a band-pass preamplifier 57. Following the preamplifier is a filter circuit 58, with both the band-pass preamplifier and the filter being designed to pass the frequency of the pulse generator 50. Following the filter is a detector 59 which is designed to detect toe original sensor signal in the transmitted pulse. Thus, if amplitude modulation is used, the detector could be of conventional diode-type amplitude modulation detector. Similarly, if the digital code is used, the detector would detect the digital code. The detector is coupled to a modulator 60 which is coupled to a transmitting circuit 62 which also receives power from a power supply 16. Transmitter 62 can be a conventional AM radio transmitter in which the detected sensor signal is used to modulate the transmitted signal which is supplied to the antenna 16.

While the above-described system relates to the use of a radio link for coupling the drilling rig to the recording unit as explained, a wire link in combination with sliprings may also be sued. The use of the radio link is preferred, since the fidelity of the transmitted signal will be greatly improved over that possible with sliprings. Also, the use of sliprings on a drilling rig presents several difficulties, since they must be maintained in an extremely adverse environment. Also, the rough handling of the Kelly unit on the drill rig may seriously damage any sliprings provided thereon.

Figure 5:
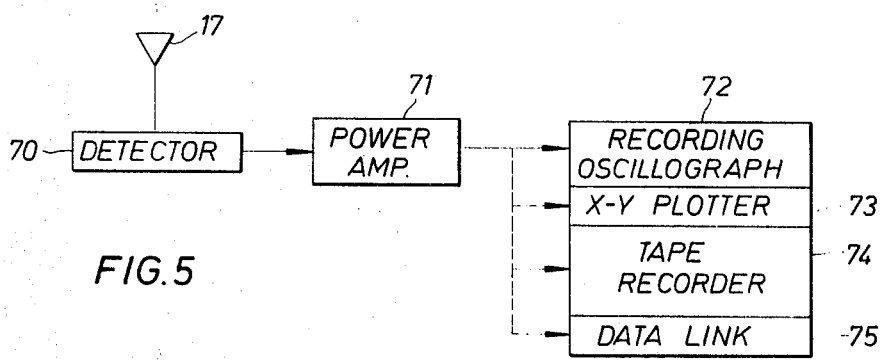
FIG. 5 is a view of the recording system.

Referring to FIG. 5, there is shown a simplified block diagram of the recording unit. The recording unit is provided with an antenna 17 for receiving the transmitted radio signal which is then supplied to a detector 70. The detector again is designed to detect a transmitted signal and convert it back to its original form. The signal is then supplied to a power amplifier 71 which feeds the various recording units 72 through 75. As shown in FIG. 5, the signal can be recorded on a conventional recording oscillograph 72 and X–Y plotter 73 and tape recorder 74 or supplied to a date link 75 which would retransmit the information to a remote location where it could be processed or otherwise used.

Figure 6:
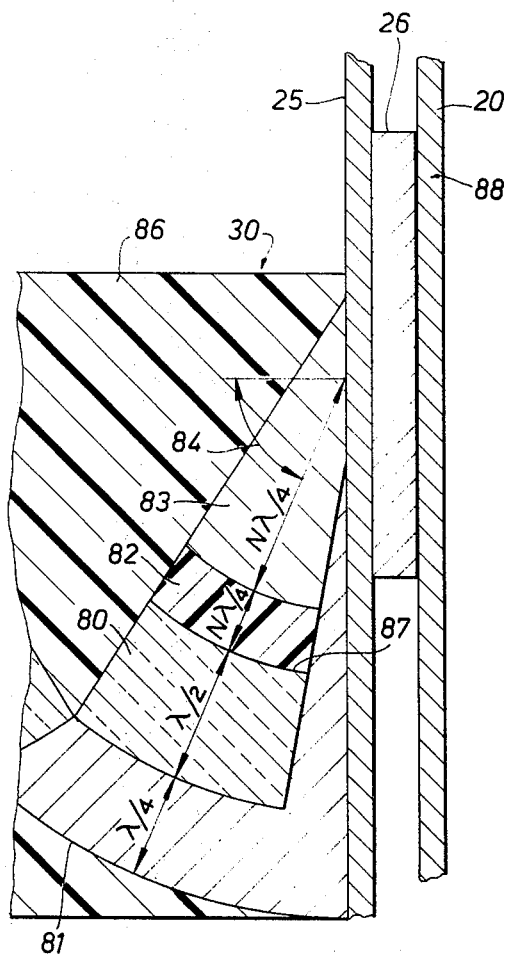
FIG. 6 is a detailed elevation view of the downhole transducer.

Referring now to FIG. 6, there is shown an elevation view of one of the transmitting transducers 30. Each of the transducers comprises a piezoelectric element 80, which is preferably formed of a ceramic material such as lead zirconate or titanate. The transducer element in addition is provided with a spherical concave face 87 which is designed to concentrate or focus the longitudinal waves at a point 88 in the outer housing 20 of the instrument package. The waves, if concentrated and injected at the proper angle are readily converted to shear waves in the outer housing 20. The ceramic transducer 80 is provided with an overall length of one-half wavelength which insures that it will operate at the lowest resonant mode at the fundamental frequency of the selected frequency. The transducer element is backed by a reflecting element 81 preferably formed of lead or similar materials. Similarly, the transducing element is coupled to the inner wall of the inner housing 25 by means of a spacing element 82, preferably formed of a plastic material such as lucite or similar material having an index of refraction which will insure the optimum transformation of energy along the coupling system. Finally, the element is coupled to the inner wall by means of a transistion piece 83 which is preferably formed of brass or similar materials that are also selected with relation to their index of refraction. It should be noted that the reflecting material 81 and the coupling element 82 and 83 are all provided with an overall dimension related to a quarter wavelength of the selected frequency in the material. The exact number of quarter wavelengths for each material should be selected so that the overall coupling between the transducer element and the inner wall is an odd number of quarter wavelengths. Thus, if a plastic material 82 is provided with a one-quarter wavelength, the thickness of the transition piece 83 should be provided with half or a full wavelength thickness.

The transducers are disposed at an angle 84 with respect to a vertical to the inner wall of the inner housing 25. This angle is selected with respect to the index of refraction of the materials used and in the particular example described above, the angle would be approximately 65°. In addition to disposing the composite transducer element at an angle, they are also oriented at an angle of less than 90° with respect to a vertical plane through the inner housing 25. In order to insure that the transmitting transducers are retained in their proper positions, they are embedded in a potting material as for example, epoxy 86 so as to be retained in their desired orientation.

While only one transducer element is shown in FIG. 6, a plurality of elements are used. The elements are spaced around the interior of the inner housing 25 and positioned to insure that the signals from each transducer element reinforce the generated shear waves and do not tend to cancel them. For example, if eight transducer elements were used, they could be placed at 45° positions around the inner wall and would thus tend to reinforce instead of cancel the shear waves.

Figure 7:
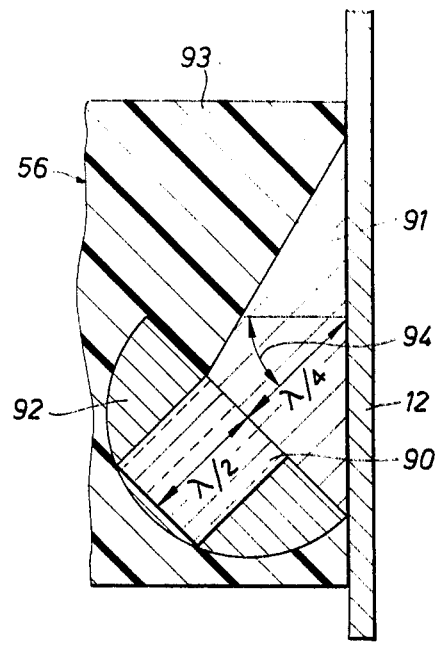
FIG. 7 is a detailed view of the surface transducer.

An elevation view of one of the receiving transducers 56 is shown in FIG. 7 and corresponds substantially to the transmitting transducer. The actual receiving element 90 is preferably a ceramic element such as lead zirconate or titanate, or similar piezoelectric material. The receiving transducer 56 is enclosed within a reflecting element 92 which is preferably formed of a lead or a similar material. Likewise, the receiving element is coupled to the inner wall of the drill pipe 12 by means of a transition piece 91 which is formed of bronze or a similar material. The materials are selected so that they provide optimum matching between pipe wall and the transducer to provide optimum transfer of the received signal to the transducer element. It should be noted that the transition piece 91 is provided with an effective length equal to approximately a quarter wavelength. Likewise, the axis of the element is disposed at an angle 94 that is preferably equal to the index of refraction of the materials chosen. For the example given above this angle would be approximately 43°. In addition to being inclined at the angle 94 to the vertical, the transducer element is also inclined at an angle tangent to the sidewall of the drill pipe to improve its coupling between the drill pipe and the transducer element. While a number of receiving transducers may be used, normally they can be less than the transmitting transducers, for example four elements spaced 90° apart could be used.

Numerous variations and modifications may obviously be made in the structure herein described without departing from the present invention. Accordingly, it should be clearly understood that the forms of the invention herein described and shown in the FIGS. of the accompanying drawings are illustrative only and are not intended to limit the scope of the invention.

What I claim is:

1. A method for transmitting information over a drill pipe comprising
    generating ultrasonic waves having a predetermined frequency,
    modulating said ultrasonic waves in response to said information,
    injecting said modulated ultrasonic waves into the drill pipe wall at one point on the drill pipe to form ultrasonic shear waves in the drill pipe, and
    receiving said shear waves at another point on the pipe and detecting the information impressed thereon.

2. The method of claim 1 wherein the shear waves are generated in pulses with each pulse being of sufficient duration to travel the length of a section of the drill pipe and be reflected to the opposite end.

3. An apparatus for transmitting information over a drill pipe comprising
    a first transducer means disposed in the drill pipe for converting electrical energy to ultrasonic compressional waves and adapted to induce shear waves in the wall of the drill pipe,
    an oscillator means coupled to said transducer for driving said transducer at an ultrasonic frequency,
    a modulating means coupled to said oscillator means for modulating the oscillator signal in response to the information, and
    a second transducer means disposed in the drill pipe at a point spaced from said first transducer means and adapted to receive said modulated ultrasonic shear waves from said first transducer means.

4. The apparatus as described in claim 3, wherein said first transducer means includes
    a piezoelectric element for converting electrical energy to ultrasonic longitudinal waves and adapted for focusing said ultrasonic longitudinal waves at a predetermined point in the drill pipe wall, and
    means for coupling said piezoelectric element to the drill pipe wall for injecting said ultrasonic longitudinal waves into said wall for converting said longitudinal waves into ultrasonic shear waves.

5. The apparatus as described in claim 3, wherein said oscillator means comprises a pulse generator for generating high frequency pulses of sufficient duration to travel the length of a section of the drill pipe and be reflected to the opposite end.

6. The apparatus as described in claim 3, wherein said second transducer means includes
    a piezoelectric element for converting ultrasonic longitudinal waves to electrical energy, and
    means for coupling said piezoelectric element to the drill pipe wall for receiving said ultrasonic shear waves traveling in said wall and converting said shear waves to ultrasonic longitudinal waves.

7. In combination with rotary drilling equipment for drilling a borehole, including a string of drill pipe, a drill bit and drilling fluid circulating through said drill pipe, the apparatus comprising
    downhole instrument means mounted in the drill string adjacent the drill bit for measuring environmental parameters of the borehole, generating ultrasonic compressional waves representative of said measured environmental parameters, and injecting said compressional waves into the string of drill pipe as ultrasonic shear waves, and uphole instrument means mounted in an upper section of the drill string for receiving said ultrasonic shear waves transmitted from said downhole instrument means through the drill string walls and converting said shear waves into electrical signals representative of said measured environmental parameters.

8. The apparatus as described in claim 7, including transmitting means coupled to said uphole instrument means for transmitting said electrical signals representative of said measured environmental parameters to a remote location, and recording means remote from said drilling equipment for receiving and recording said transmitted signals from said transmitter means.

9. The apparatus as described in claim 7, wherein said downhole instrument means comprises sensing means for measuring said environmental parameters of the borehole, a pulse generator for generating ultrasonic pulses, a modulator coupled to said sensing means and said pulse generator for modulating said ultrasonic pulses in response to the measurements of said environmental parameters, and at least one transmitting transducer for converting said modulated ultrasonic pulses to ultrasonic compressional waves and adapted for injecting said compressional waves into said drill string as ultrasonic shear waves.

10. The apparatus as described in claim 9, wherein said uphole instrument means includes at least one receiving transducer for receiving said transmitted ultrasonic shear waves and converting said waves into electrical signals representative of said measured environmental parameters, a preamplifier for receiving said electrical signals and amplifying said signals to a predetermined level, said preamplifier passing the frequency band of said ultrasonic pulses, a filter circuit coupled to the output of said preamplifier for passing the frequency band of said ultrasonic pulses, and a detector circuit for receiving the amplified modulated ultrasonic pulses from said filter circuit and detecting the modulating electrical signals representative of said environmental parameters measured by said sensors.